No. 754,147. PATENTED MAR. 8, 1904.
J. VON KOWALSKI & I. MOSCICKI.
APPARATUS FOR ELECTRICAL PRODUCTION OF NITROGEN
OR OTHER COMPOUNDS.
APPLICATION FILED FEB. 21, 1903.
NO MODEL.
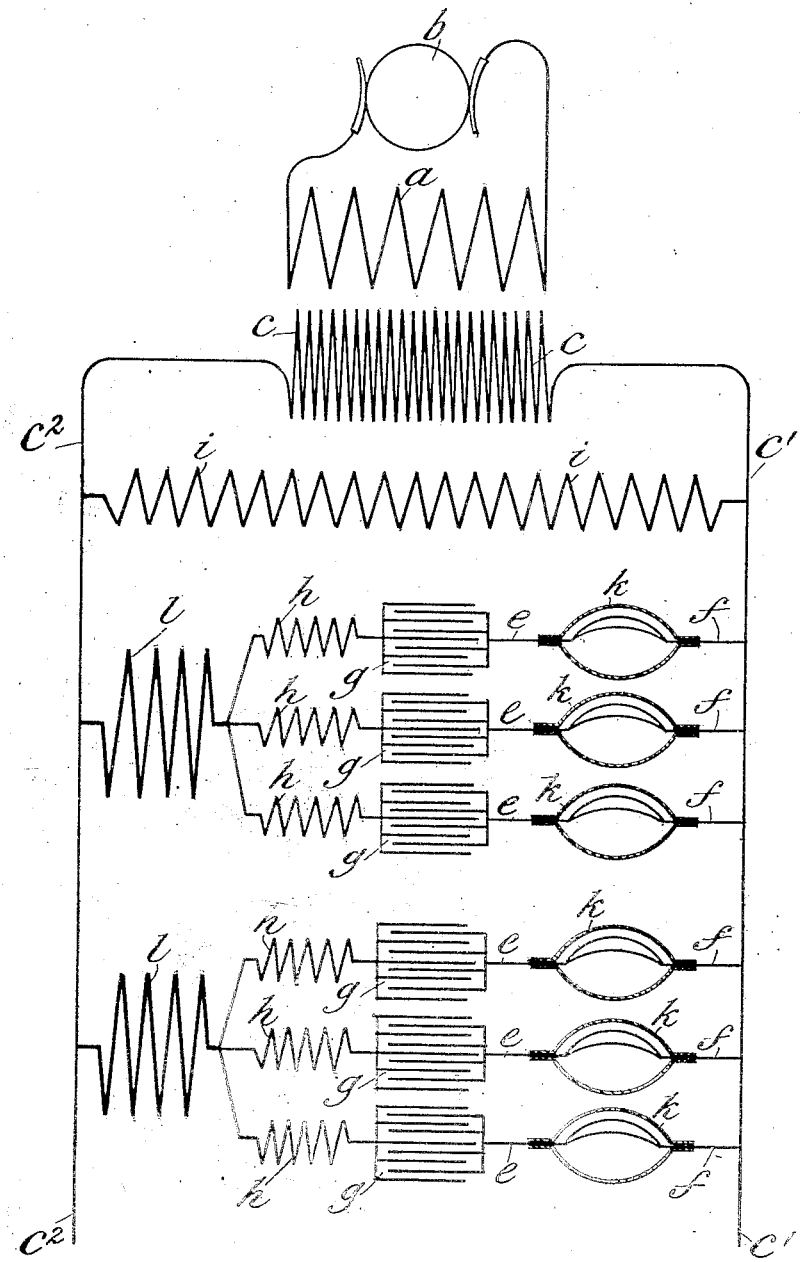

No. 754,147. Patented March 8, 1904.

UNITED STATES PATENT OFFICE.

JOSEF VON KOWALSKI AND IGNAZ MOSCICKI, OF FREIBURG, SWITZERLAND.

APPARATUS FOR ELECTRICAL PRODUCTION OF NITROGEN OR OTHER COMPOUNDS.

SPECIFICATION forming part of Letters Patent No. 754,147, dated March 8, 1904.

Application filed February 21, 1903. Serial No. 144,501. (No model.)

*To all whom it may concern:*

Be it known that we, JOSEF VON KOWALSKI, a citizen of Austria-Hungary, and IGNAZ MOSCICKI, a citizen of Russia, residing at Freiburg, Switzerland, have invented certain new and useful Improvements in Apparatus for Electrical Production of Nitrogen or other Compounds; and we do hereby declare the following to be a full, clear, and exact description of the invention, such as will enable others skilled in the art to which it appertains to make and use the same.

Our invention relates to an apparatus for obtaining nitrogen compounds from the air or other gases by means of electricity.

It is well known that the passage of an electrical spark through the air will result in the production of ozone and nitrogen compounds containing oxygen.

The object of our invention is to provide means for obtaining such nitrogen compounds by electricity without the employment of complicated devices for producing the sparks in the different spark-gaps or for maintaining the proper size of such sparks.

With this general object in view and some others, which will be obvious to those skilled in the art from the description hereinafter, the invention consists in the features, details of construction, and combination of parts, which will first be described in connection with the accompanying drawing and then more particularly pointed out in the claims.

The drawing is a diagrammatic view of an apparatus embodying our invention.

Referring to the drawing, $a$ is a primary winding of a transformer arranged to be supplied with current from a suitable source—as, for example, by an alternator, (indicated at $b$.) At $c$ is indicated the secondary winding of the transformer arranged to supply currents to the leads $c'$ $c^2$, across which leads are arranged in parallel the consumption branches, each containing a pair of electrodes $e$ $f$, a condenser $g$, and an inductance-coil $h$, arranged in series. The electrodes $e$ $f$ of each consumption branch form a pair, and each pair is inclosed in a suitable receptacle $k$, to which the air or other gases to be acted upon may be supplied and the products withdrawn by any suitable means. (Not shown and not constituting a part of our invention.)

At $i$ is shown a main inductance-coil $h$, arranged across the leads $c'$ $c^2$ in parallel with the consumption branches.

The capacity of each condenser $g$ and the inductance of its corresponding coil $h$ are so related to each other and to the respective consumption branch that oscillatory currents will be set up in said branch circuit, thereby producing a series of sparks in the nature of an arc across the gap between the two electrodes of the respective consumption branch; but as it is necessary for the maximum production of the nitrogen compound that the periodicity of the oscillatory discharge be not too high the capacity of the condensers $g$ and the self-induction of the respective coils $h$ are such that while the oscillatory currents produced in the consumption branches have a frequency higher than that of the alternating current supplied by the secondary winding $c$ still their frequency does not overstep the limit fixed by the requirements of maximum production of the nitrogen products, as will be more fully explained hereinafter.

By employing a plurality of condensers in parallel with each other we obtain a reciprocal action between said condensers, whereby the periodicity of the oscillatory current is sufficiently high for the purpose intended, while at the same time the inductance-coil $h$ prevents said periodicity from overstepping the limits required, as above pointed out.

It is the purpose of the inductance-coil $i$ to eliminate or at least materially reduce the production of a wattless component in the secondary circuit in order to maintain a high standard of efficiency in the said circuit and in the main circuit also. The said inductance-coil $i$, therefore, must be properly proportioned for the attainment of this object. Furthermore, in order to avoid the loss of energy through hysteresis and eddy-currents in the transformer it is preferable to arrange the consumption branches in groups in parallel with one another, each group being in series with a group inductance-coil $l$, each of said inductance-coils $l$ being so proportioned that it will maintain the original frequency of the alternating currents in all that part of the secondary circuit outside the consumption branch by preventing the propagation of the oscillatory currents by the condenser beyond its respective consumption branch. Moreover, by arranging the consumption branches in groups and each group in series with an inductance-coil $l$ we are enabled to retain the advantage of obtaining an interaction of the condensers upon each other with the resulting necessary high frequency while at the same time preventing the production of the oscillatory currents in the leads $c'$ $c^2$ and secondary winding $c$.

The operation of our apparatus is as follows: The necessary air or gas being supplied to the receptacles $k$ and the alternator $b$ set in action, a series of electric arcs are formed between the respective electrodes $e$ and $f$ by the charging and discharging of the corresponding condensers $g$, reciprocal action of the condensers on each other producing oscillatory currents of a high frequency in each consumption branch, modified by the inductance of the respective coils $h$, whereby a stream of sparks in the nature of an arc is maintained in each receptacle $k$, such arc acting upon the air or gas contained in and supplied to said receptacle, and thereby developing the desired nitrogen compounds. Owing to the circulation maintained in the receptacle $k$, as hereinbefore described, the production of said nitrogen compounds is carried on continuously. It will be noted that in our construction the desired periodicity of the oscillatory currents is obtained without the employment of complicated apparatus.

As an example of our invention we give the following data taken from a plant for the production of nitric acid: The secondary circuit had an electromotive force of fifty thousand volts, producing spark-arcs of about twenty-four centimeters in each spark-gap. In each consumption branch the current was 0.05 amperes and the frequency was about six thousand alternations per second, while the frequency of the alternating current in the secondary circuit outside the consumption branches was fifty alternations per second. The apparatus required thirty-three horsepower of electric energy, and with this there were obtained eleven hundred and fifty-five grams of nitric acid per hour from the surrounding atmospheric air—that is, thirty-five grams of nitric acid per horse-power hour. No attempt was made to obtain any of the other by-products—such as oxygen, nitrogen dioxid, nitrogen monoxid, and the like—because the plant was operated solely for the production of nitric acid. It was found that the frequency of the current in the consumption branch should have a minimum of six thousand alternations per second, and while the production of nitric acid was not essentially influenced up to ten thousand alternations per second it was found advisable not to go beyond the maximum frequency, because then the output of nitric acid began to fall.

Having thus fully described our invention, what we claim as new, and desire to secure by Letters Patent, is—

1. The combination, with an electric circuit and a plurality of pairs of electrodes arranged in said circuit in parallel, of a plurality of condensers arranged in parallel, each condenser being in series with its respective pair of electrodes, and means for supplying alternating current to the circuit.

2. The combination, with a circuit and means for supplying alternating current to said circuit, of a plurality of pairs of electrodes arranged in said circuit, said pairs being in parallel with each other, a plurality of condensers, each in series with its respective pairs of electrodes, and an induction-coil in series with each condenser.

3. The combination, with an electric circuit, a pair of electrodes included in the circuit and between which the gas to be acted upon may flow, of a condenser in series with the electrodes, a main inductance-coil in parallel with the condenser, and means for supplying alternating current to said circuit.

4. The combination, with a circuit and means for supplying alternating currents to said circuit, of a plurality of pairs of electrodes arranged in said circuit, said pairs being in parallel with each other, the electrodes of each pair being arranged to receive between them the gas to be acted upon, a plurality of condensers, each in series with its respective pair of electrodes, and an inductance-coil in series with each condenser.

5. The combination, with a circuit and means for supplying alternating currents to said circuit, of a plurality of pairs of electrodes arranged in said circuit, said pairs being in parallel with each other, the electrodes of each pair being arranged to receive between them the gas to be acted upon, a plurality of condensers, each in series with its respective pair of electrodes, an inductance-coil in series with each condenser, and a main inductance-coil in parallel with all the electrodes.

6. The combination, with an electric circuit having a plurality of consumption branches arranged in parallel and in groups, of means for supplying alternating current to said circuit, a pair of electrodes, a condenser and an inductance-coil arranged in series in each consumption branch, and a group inductance-coil in series with each group of consumption branches.

7. The combination, with an electric circuit having a plurality of consumption branches arranged in parallel and in groups, of means for supplying alternating current to said circuit, a pair of electrodes, a condenser and an inductance-coil arranged in series in each consumption branch, a group inductance-coil in series with each group of consumption branches, and a main inductance-coil in parallel with the consumption branches.

8. The combination, with a transformer and means for supplying alternating current to the primary winding of said transformer, of a pair of leads connected to the secondary winding of the transformer, a plurality of consumption branches in multiple between said leads and arranged in groups, a pair of electrodes, a condenser and an inductance-coil in each consumption branch, a group inductance-coil in series with each group of consumption branches, and a main inductance-coil arranged between the leads and in parallel with the consumption branches.

9. The combination, with a transformer and means for supplying alternating current to the primary winding of said transformer, of a pair of leads connected to the secondary winding of the transformer, a plurality of consumption branches in multiple between said leads and arranged in groups, a pair of electrodes, a condenser and an inductance-coil in each consumption branch, a group inductance-coil in series with each group of consumption branches, a main inductance-coil arranged between the leads and in parallel with the consumption branches, and a receiver inclosing each pair of electrodes.

In testimony whereof we affix our signatures in presence of two witnesses.

JOSEF VON KOWALSKI.
   IGNAZ MOSCICKI.

Witnesses:
 EDUARD VON WALDKIRCH,
 FRITZ NASGALI.